(12) United States Patent
Kim (10) Patent No.: US 9,726,220 B2
(45) Date of Patent: Aug. 8, 2017

(54) THRUST FOIL AIR BEARING (71) Applicant: TNE KOREA CO., LTD., Daejeon (KR)

(72) Inventor: Kyeong Su Kim, Daejeon (KR)

(73) Assignee: TNE KOREA CO., LTD., Daejeon (KR)

( * ) Notice: Subject to any disclaimer, the term of this patent is extended or adjusted under 35 U.S.C. 154(b) by 0 days.

(21) Appl. No.: 15/312,977

(22) PCT Filed: Mar. 14, 2016

(86) PCT No.: PCT/KR2016/002491
§ 371 (c)(1),
(2) Date: Nov. 21, 2016

(87) PCT Pub. No.: WO2016/153201
PCT Pub. Date: Sep. 29, 2016

(65) Prior Publication Data
US 2017/0191522 A1 Jul. 6, 2017

(30) Foreign Application Priority Data
Mar. 20, 2015 (KR) .................. 10-2015-0039031

(51) Int. Cl.
F16C 32/06 (2006.01)
F16C 17/04 (2006.01)
(Continued)

(52) U.S. Cl.
CPC ............ *F16C 17/042* (2013.01); *F16C 27/02* (2013.01); *F16C 43/02* (2013.01)

(58) Field of Classification Search
CPC ..................................................... F16C 17/042
See application file for complete search history.

(56) References Cited

U.S. PATENT DOCUMENTS 4,225,196 A * 9/1980 Gray ..................... F16C 17/042
384/121
5,248,205 A * 9/1993 Gu ........................ F16C 17/042
384/106
(Continued)

FOREIGN PATENT DOCUMENTS

JP  H01-242816 A  9/1989
JP  4041168 B2    1/2008
(Continued)

*Primary Examiner* — Thomas R. Hannon
(74) *Attorney, Agent, or Firm* — KORUS Patent, LLC; Seong Il Jeong (57) ABSTRACT A thrust foil air bearing includes a bottom plate comprising a coupling portion protruding toward a rotating portion, an intermediate plate arranged above an upper surface of the bottom plate and comprising a bump foil that is elastically deformable and a first through-hole through which the coupling portion passes, and a top plate arranged above an upper surface of the intermediate plate, facing the rotating portion, and comprising a top foil arranged above the bump foil and contactable with the rotating portion and a second through-hole, through which the coupling portion passes, formed at a position corresponding to the first through-hole. The coupling portion couples the bottom plate, the intermediate plate, and the top plate to one another by passing through the first through-hole and the second through-hole. Thus, the thrust foil air bearing may be rapidly assembled without a complicated process such as welding.

8 Claims, 9 Drawing Sheets (51) Int. Cl.
*F16C 27/02* (2006.01)
*F16C 43/02* (2006.01)

(56) References Cited

U.S. PATENT DOCUMENTS

| | | | | |
|---|---|---|---|---|
| 6,158,892 A | * | 12/2000 | Stewart | F16C 17/042 384/105 |
| 6,261,002 B1 | | 7/2001 | Ermilov et al. | |
| 7,108,488 B2 | * | 9/2006 | Larue | F16C 17/024 384/103 |
| 9,033,579 B2 | * | 5/2015 | Yoshino | F16C 17/042 384/105 |

FOREIGN PATENT DOCUMENTS

| KR | 10-2001-0063913 A | 7/2001 |
|---|---|---|
| KR | 10-2001-0063914 A | 7/2001 |
| KR | 10-0590139 B1 | 6/2006 |

\* cited by examiner

THRUST FOIL AIR BEARING

TECHNICAL FIELD

The present invention relates to a thrust foil air bearing, and more particularly, to a thrust foil air bearing which may be rapidly assembled without a complicated process such as welding.

BACKGROUND ART

Air bearings support a load by allowing a rotation shaft to float due to pressure of compressed air between the rotation shaft and a bearing.

In the air bearing, when a gas having viscosity, such as air, moves along with a movable surface and meets a stationary surface, the gas is compressed and a pressure of air trapped between the movable surface and the stationary surface increases, thereby lifting the movable surface.

The air bearing may a thrust air bearing that supports a load applied in a lengthwise direction of the rotation shaft or a journal air bearing that supports a load applied in a radial direction with respect to the rotation shaft.

Another type of the thrust air bearing is a thrust foil air bearing which uses a foil of a thin material to facilitate formation of pressure and improve dynamic stability at high speed.

Figure 11:
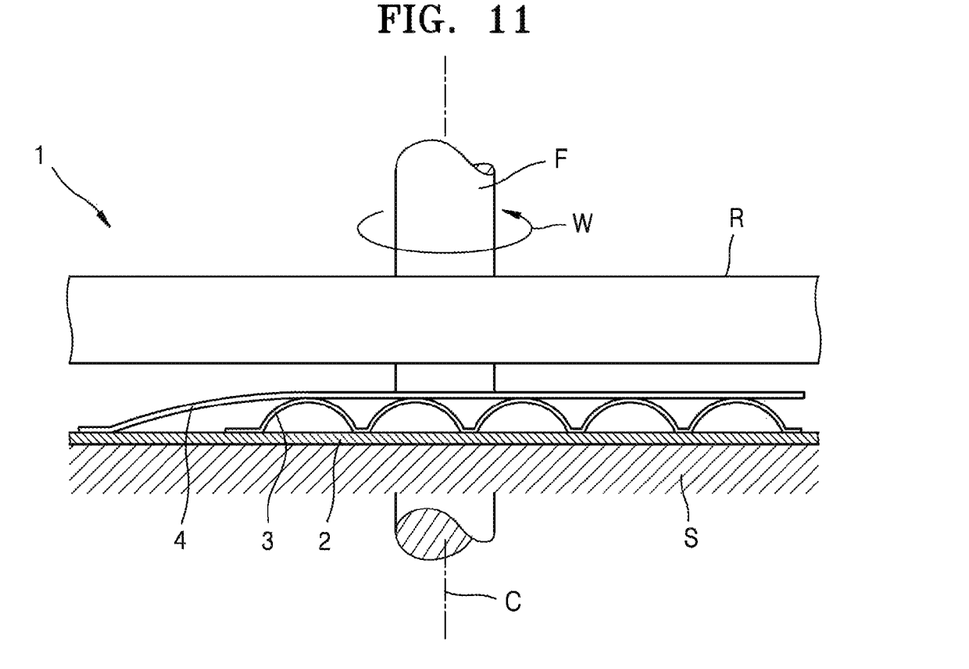
FIG. 11 is a cross-sectional view of a foil air bearing according to the related art.

A thrust foil air bearing 1 according to the related art, as illustrated in FIG. 11, may include a bottom plate 2 that is a plate member coupled to a stationary portion S, a bump foil 3 arranged on an upper surface of the bottom plate 2 and elastica deformable, and a top foil 4 arranged above the bump foil 3 and contactable with a rotating portion R. The rotating portion R is coupled to a rotation shaft F rotating in a preset rotation direction W around a centerline C.

In the thrust foil air bearing 1, the bump foil 3 and the top foil 4 are coupled to the upper surface of the bottom plate 2 by welding. When the bump foil 3 and the top foil 4 are coupled to the bottom plate 2 by welding, the entire structure of the bearing is simplified and initial product development costs and mold manufacturing costs may be reduced. However, several series of manufacturing processes such as a press process and a welding process are required and manufacturing welding jigs and welding quality management are needed. Thus, the thrust foil air bearing is disadvantageous in terms of product price management and quality management and thus is not suitable for mass production.

DETAILED DESCRIPTION OF THE INVENTIVE CONCEPT

Technical Problem

The present inventive concept provides a thrust foil air bearing having an improved structure that allows rapid bearing assembling without a complicated process such as welding.

Technical Solution

According to an aspect of the present inventive concept, there is provided a thrust foil air bearing for use in an apparatus including a stationary portion and a rotating portion relatively rotating around a centerline with respect to the stationary portion includes a bottom plate coupled to the stationary portion and comprising a coupling portion protruding toward the rotating portion, an intermediate plate arranged above an upper surface of the bottom plate and comprising a bump foil that is elastically deformable and a first through-hole through which the coupling portion passes, and a top plate arranged above an upper surface of the intermediate plate, facing the rotating portion, and comprising a top foil arranged above the bump foil and contactable with the rotating portion and a second through-hole, through which the coupling portion passes, formed at a position corresponding to the first through-hole, in which the coupling portion couples the bottom plate, the intermediate plate, and the top plate to one another by passing through the first through-hole and the second through-hole.

The coupling portion of the bottom plate may be rotatable around the centerline between a locking position, where the coupling portion is detachably coupled to the intermediate plate and the top plate, and a release position, where the coupling portion is separable from the intermediate plate and the top plate.

The coupling portion may be previously bent in a shape of "⌐" or is bent in a shape of "⌐" after passing though the first through-hole and the second through-hole.

The first through-hole and the second through-hole may have a slot shape extending along a radial direction with respect to the centerline.

Each of the bump foil and top foil may be plurally provided in a circumferential direction with respect to the centerline. The bump foil may have one end coupled to an intermediate plate main body and another end formed in a wing shape and capable of performing a free motion, and the top foil may have one end coupled to a top plate main body and another end formed in a wing shape and capable of performing a free motion. The first through-hole may be formed between the other end of the bump foil and the intermediate plate main body, and the second through-hole may be formed between the other end of the top foil and the top plate main body.

The stationary portion may include a bearing mounting pin that is a protruding rod member, and each of the bottom plate, the intermediate plate, and the top plate may include a bearing mounting hole through which the bearing mounting pin passes.

The coupling portion of the bottom plate may be rotatable around the centerline between a locking position, where the coupling portion is detachably coupled to the intermediate plate and the top plate, and a release position, where the coupling portion is separable from he intermediate plate and the top plate. When the coupling portion is at the locking position, the bearing mounting holes of the bottom plate, the intermediate plate, and the top plate may be aligned in a line so that the bearing mounting pin passes through the bearing mounting holes.

Each of the bearing mounting holes of the bottom plate, the intermediate plate, and the top plate may be plurally provided in the circumferential direction with respect to the centerline, and arrangement patterns of the bearing mounting holes formed in the bottom plate, the intermediate plate, and the top plate may be different patterns according to a position of use of the thrust foil air bearing.

The bottom plate, the intermediate plate, and the top plate may have shapes which enable mass production by a press process.

Advantageous Effects

According to the present inventive concept, a thrust foil air bearing includes: a bottom plate having a coupling portion protruding toward a rotating portion, as a member coupled to a stationary portion; a bump foil arranged above an upper surface of the bottom plate and elastically deformable; an intermediate plate having a first through-hole through which the coupling portion passes; a top plate arranged above an upper surface of the intermediate plate facing the rotating portion and arranged above the bump foil and contactable with the rotating portion; and a top plate through which the coupling portion passes and having a second through-hole at a position corresponding to the first through-hole, in which the coupling portion passes through the first through-hole and the second through-hole coupling the bottom plate, the intermediate plate, and the top plate to one another. Accordingly, the bearing may be quickly assembled without a complicated process such as welding.

BEST MODE

Hereinafter, the present inventive concept will be described in detail by explaining preferred embodiments of the inventive concept with reference to the attached drawings.

Figure 1:
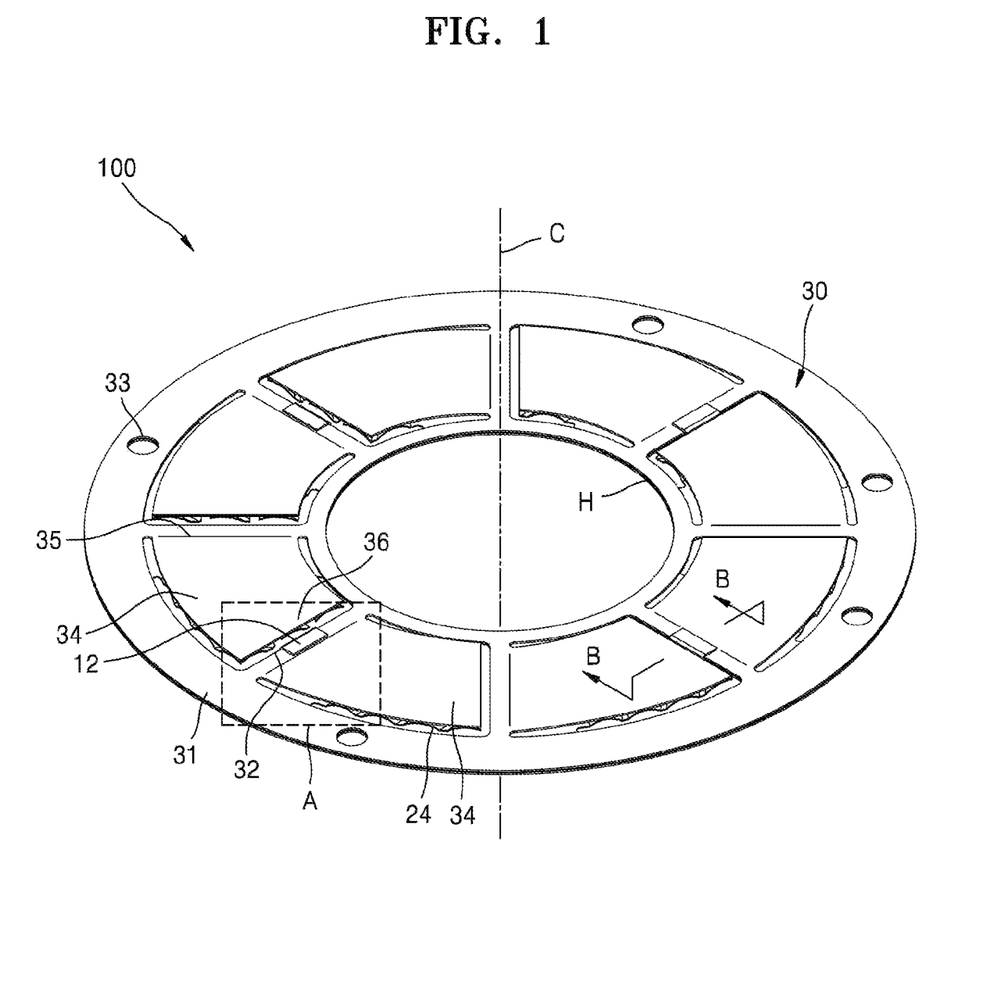
FIG. 1 is an assembled perspective view of a thrust foil air bearing according to an embodiment.
Figure 2:
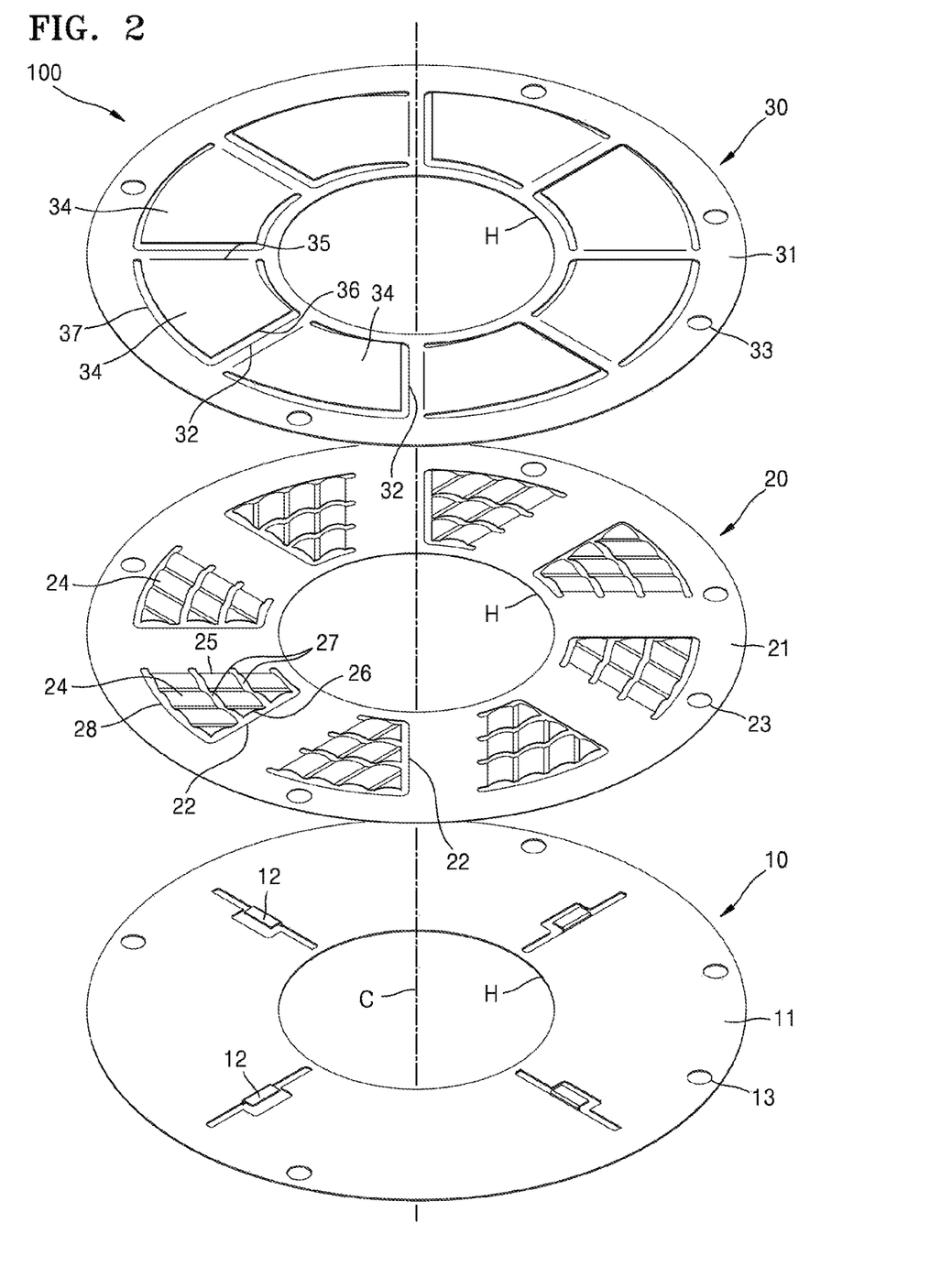
FIG. 2 is an exploded perspective view of the thrust foil air bearing of FIG. 1.
Figure 3:
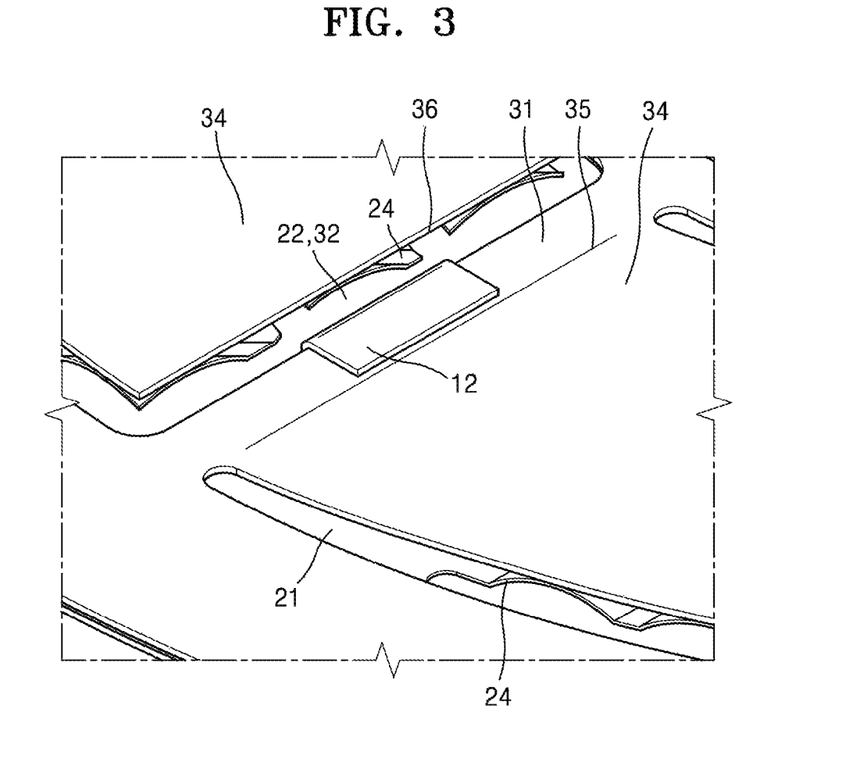
FIG. 3 is a partially enlarged view of a portion A of the thrust foil air bearing of FIG. 1.

FIG. 1 is an assembled perspective view of a thrust foil air bearing 100 according to an embodiment. FIG. 2 is an exploded perspective view of the thrust foil air bearing of FIG. 1. FIG. 3 is a partially enlarged view of a portion A of the thrust foil air bearing of FIG. 1.

Figure 6:
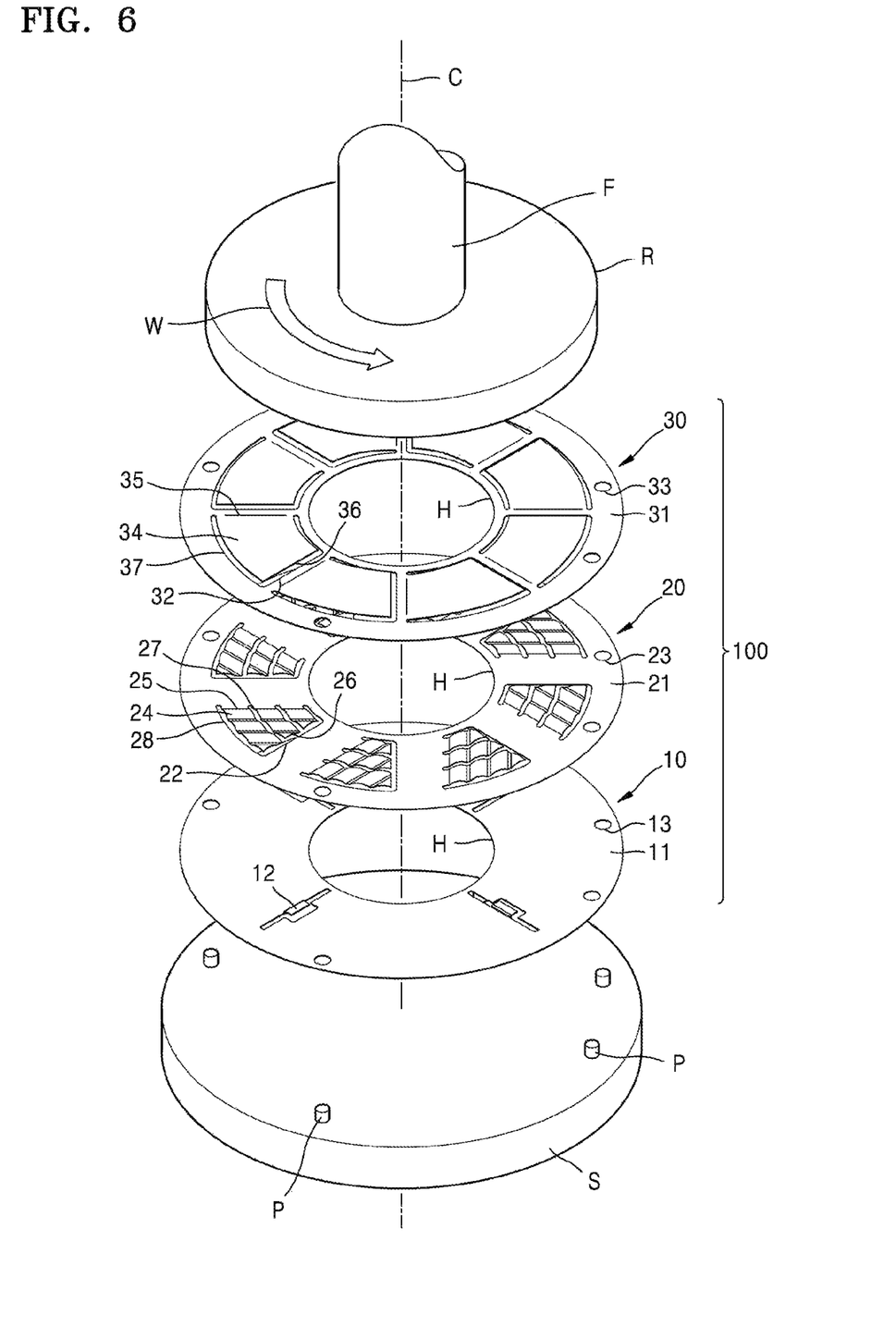
FIG. 6 is an exploded perspective view illustrating a state of use of the thrust foil air bearing of FIG. 1.

Referring to FIGS. 1 to 3, the thrust foil air bearing 100 according to the present embodiment, as an air bearing that supports a load via pressure of compressed air, is a thrust bearing usable for various apparatuses including a stationary portion S (see FIG. 6) and a rotating portion R (see FIG. 6) relatively rotating around a centerline C with respect to the stationary portion S. The thrust foil air bearing 100 may include a bottom plate 10, an intermediate plate 20, and a top plate 30.

The stationary portion S and the rotating portion R are circular disc members having a center on the centerline C. The rotating portion R is coupled to a rotation shaft F (see FIG. 6) rotating in a preset rotation direction W around the centerline C. A plurality of bearing mounting pins P, which are rod members having a circular section and protruding in a direction along the centerline C, are arranged on an upper surface of the stationary portion S.

The rotating portion R and the stationary portion S are relative terms and have meanings regarding a relative rotation with respect to each other. The rotating portion R and the stationary portion S are interchangeable terms. In the following description, however, it is assumed that the stationary portion S denotes a fixed part in an absolute coordinate system and the rotating portion R denotes a rotating part in the absolute coordinate system.

Figure 9:
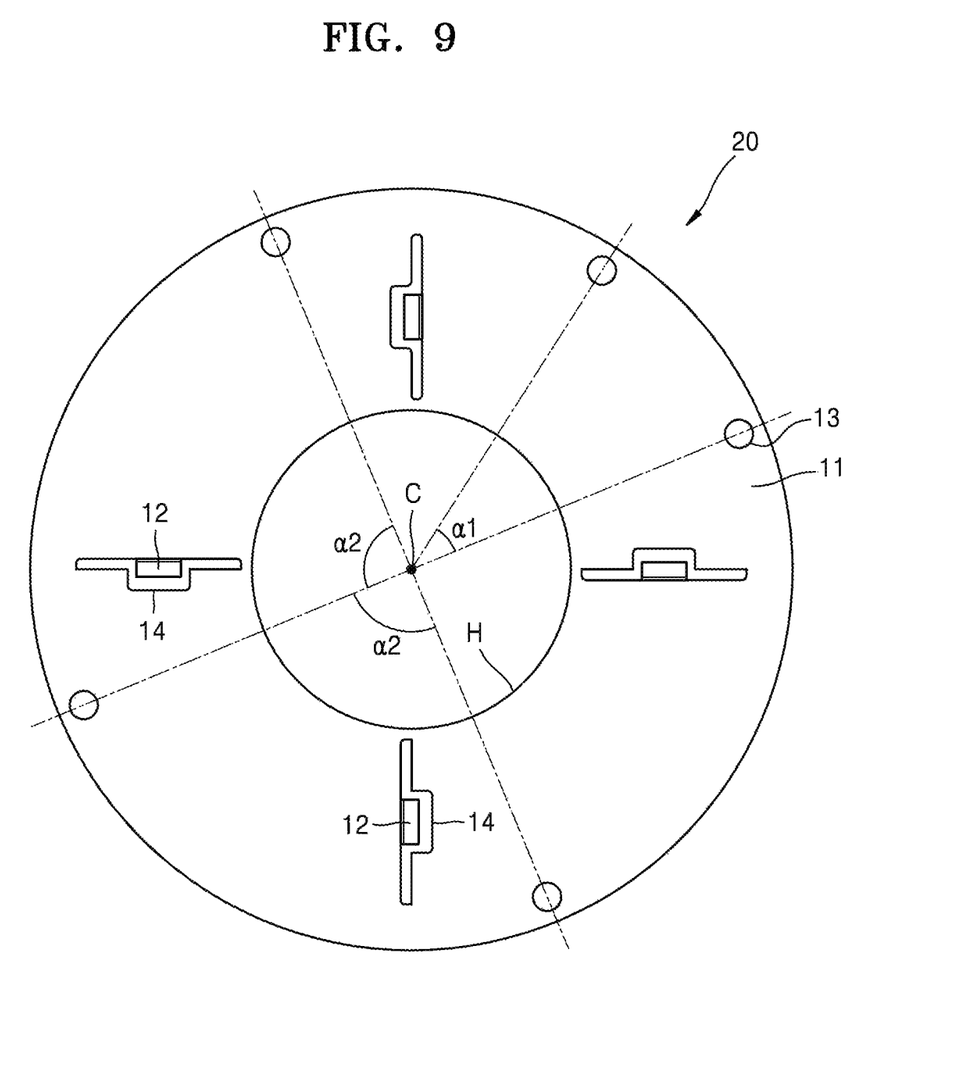
FIG. 9 is a plan view of a bottom plate of FIG. 2.

The bottom plate 10, which is a circular disc member manufactured by press processing a metal thin plate, is arranged above an upper surface of the stationary portion S. The bottom plate 10 may include a bottom plate main body 11, a coupling portion 12, and a bearing mounting hole 13.

The bottom plate main body 11 is a circular disc portion having a center on the centerline C and has a lower surface arranged on the upper surface of the stationary portion S.

A through-hole H having a center on the centerline C is formed at the center of the bottom plate main body 11.

The coupling portion 12, which is a portion previously bent in a shape of "]", protrudes from the bottom plate main body 11 toward the rotating portion R.

The coupling portion 12 is provided as a plurality of coupling portions spaced apart from one another at a preset interval in a circumferential direction with respect to the centerline C.

The coupling portion 12 is located between an inner circumferential surface of the bottom plate main body 11 and an outer circumferential surface of the bottom plate main body 11, with a section of the "]" shape extending long in a radial direction with respect to the centerline C.

In the present embodiment, the coupling portion 12 is located approximately halfway in the radial direction between the inner circumferential surface of the bottom plate main body 11 and the outer circumferential surface of the bottom plate main body 11.

The coupling portion 12 is formed by cutting and bending the metal thin plate filling a cut-away portion 14 (see FIG. 4) corresponding to the through-hole H of the bottom plate main body 11, through a press process.

Figure 5:
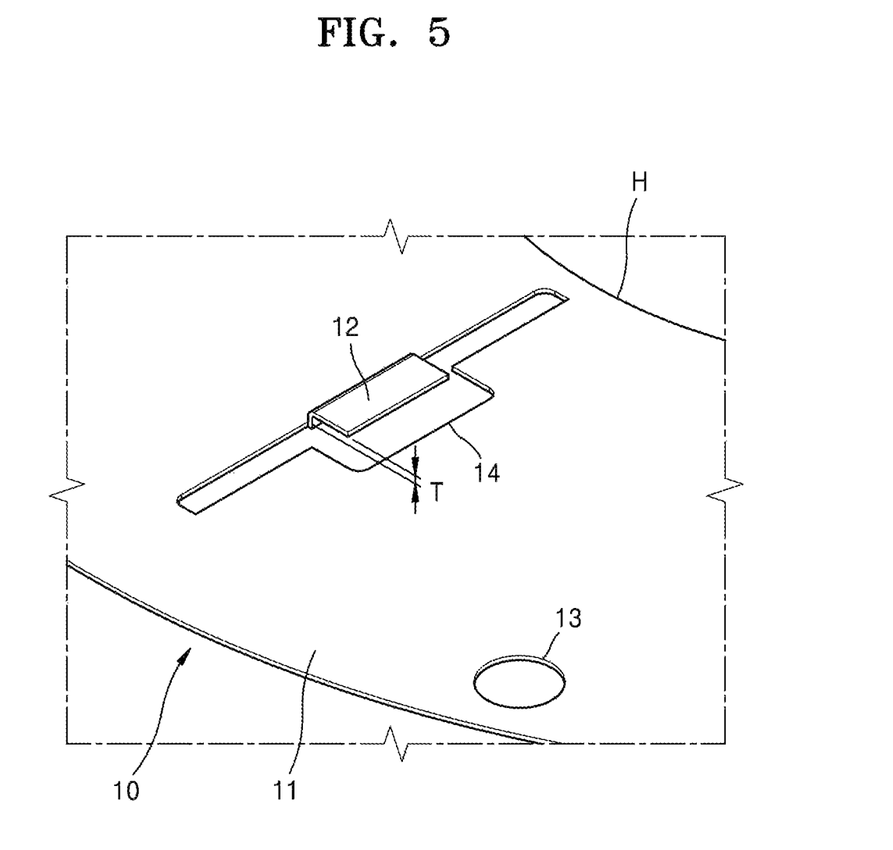
FIG. 5 is a partially enlarged view of a coupling portion of a bottom plate of FIG. 2.

A lower surface of an upper portion of the coupling portion 12 is spaced apart from an upper surface of the bottom plate main body 11 by a preset length T, as illustrated in FIG. 5. In the present embodiment, the length T is about 0.05 mm to about 0.15 mm, which is greater than a sum of thicknesses of the intermediate plate 20 and the top plate 30.

The coupling portion 12 couples the bottom plate 10, the intermediate plate 20, and the top plate 30 to be in a close contact with one another by passing through a first through-hole 22 of the intermediate plate 20 and a second through-hole 32 of the top plate 30, which are described below.

The coupling portion 12 couples the bottom plate 10, the intermediate plate 20, and the top plate 30 along the centerline C not to be separated from one another.

In the present embodiment, the coupling portion 12 of the bottom plate 10 is rotatably provided around the centerline C between a locking position where the coupling portion 12 is detachably coupled to the intermediate plate 20 and the top plate 30 and a release position where the coupling portion 12 is separable from the intermediate plate 20 and the top plate 30.

The bearing mounting hole 13, which is a hole through which the bearing mounting pin P of the stationary portion S passes, is provided as a plurality of bearing mounting holes in the circumferential direction along an edge of the bottom plate main body 11.

Figure 8:
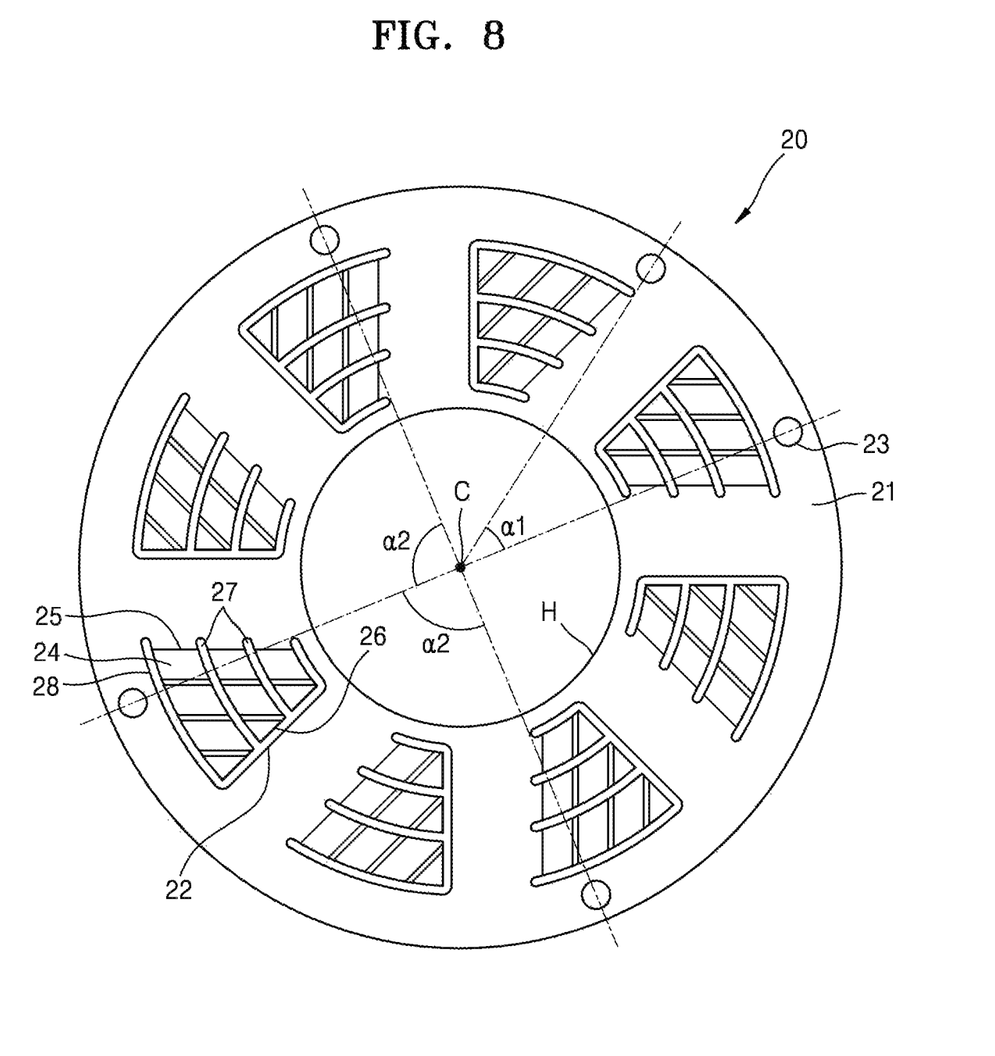
FIG. 8 is a plan view of an intermediate plate of FIG. 2.

The intermediate plate 20, which is a circular disc member manufacturing by press processing a metal thin plate, is arranged above an upper surface of the bottom plate 10 and includes an intermediate plate main body 21, the first through-hole 22, a bearing mounting hole 23, and a bump foil 24.

The intermediate plate main body 21, which is a circular disc portion having a center on the centerline C, has a lower surface arranged above the upper surface of the bottom plate main body 11. The intermediate plate main body 21 has the same diameter as the bottom plate main body 11.

The through-hole H having a center on the centerline C is formed at the center of the intermediate plate main body 21. The through-hole H of the intermediate plate main body 21 has the same diameter as the through-hole H of the bottom plate main body 11.

The first through-hole 22, which is a hole having a slot shape extending along the radial direction with respect to the centerline C, has a length and a width so that the coupling portion 12 passes through the first through-hole 22.

The bearing mounting hole 23, which is a hole through which the bearing mounting pin P of the stationary portion S passes, is provided as a plurality of bearing mounting holes in the circumferential direction along the edge of the intermediate plate main body 21.

The bearing mounting hole 23 of the intermediate plate 20 is located at a position corresponding to the bearing mounting hole 13 of the bottom plate 10, and the bearing mounting hole 23 and the bearing mounting hole 13 have the same diameter.

The bump foil 24, which is a portion having a trapezoidal planar shape has a wave form in which a plurality of crests and roots are alternately connected so as to be elastically deformable in a vertical direction along the centerline C.

The bump foil 24, like the coupling portion 12, is formed by cutting and bending a metal thin plate filling a cut-away portion 28, which is a hole of the intermediate plate main body 21, through a press process.

The bump foil 24 is provided as a plurality of bump foils spaced apart at a preset interval from one another in the circumferential direction with respect to the centerline C.

In the bump foil 24, only one side 25 of two sides 25 and 26, which are spaced apart from and facing each other in the circumferential direction with respect to the centerline C, of four sides of a trapezoid, is coupled to the intermediate plate main body 21 whereas the other three sides are free ends.

In the present embodiment, in the bump foil 24, based on a flow of air with respect to the bump foil 24, only the side 25 at the upstream side of the two sides spaced apart from and facing each other in the circumferential direction with respect to the centerline C is coupled to the intermediate plate main body 21. In other words, in the bump foil 24, while only the side 25 at the upstream side is coupled to the intermediate plate main body 21, the side 26 at the downstream side is formed in a wing shape capable of performing a free motion.

The bump foil 24 is formed long toward the downstream side along the circumferential direction with respect to the centerline C, and includes a plurality of cut lines 27 spaced apart from one another in the radial direction with respect to the centerline C.

In the present embodiment, the first through-hole 22 is formed around the side 26 at the downstream side of the two sides spaced apart from and facing each other in the circumferential direction with respect to the centerline C. The cut-away portion 28 between the side 26 at the downstream side of the bump foil 24 and the intermediate plate main body 21 may be the first through-hole 22.

Figure 7:
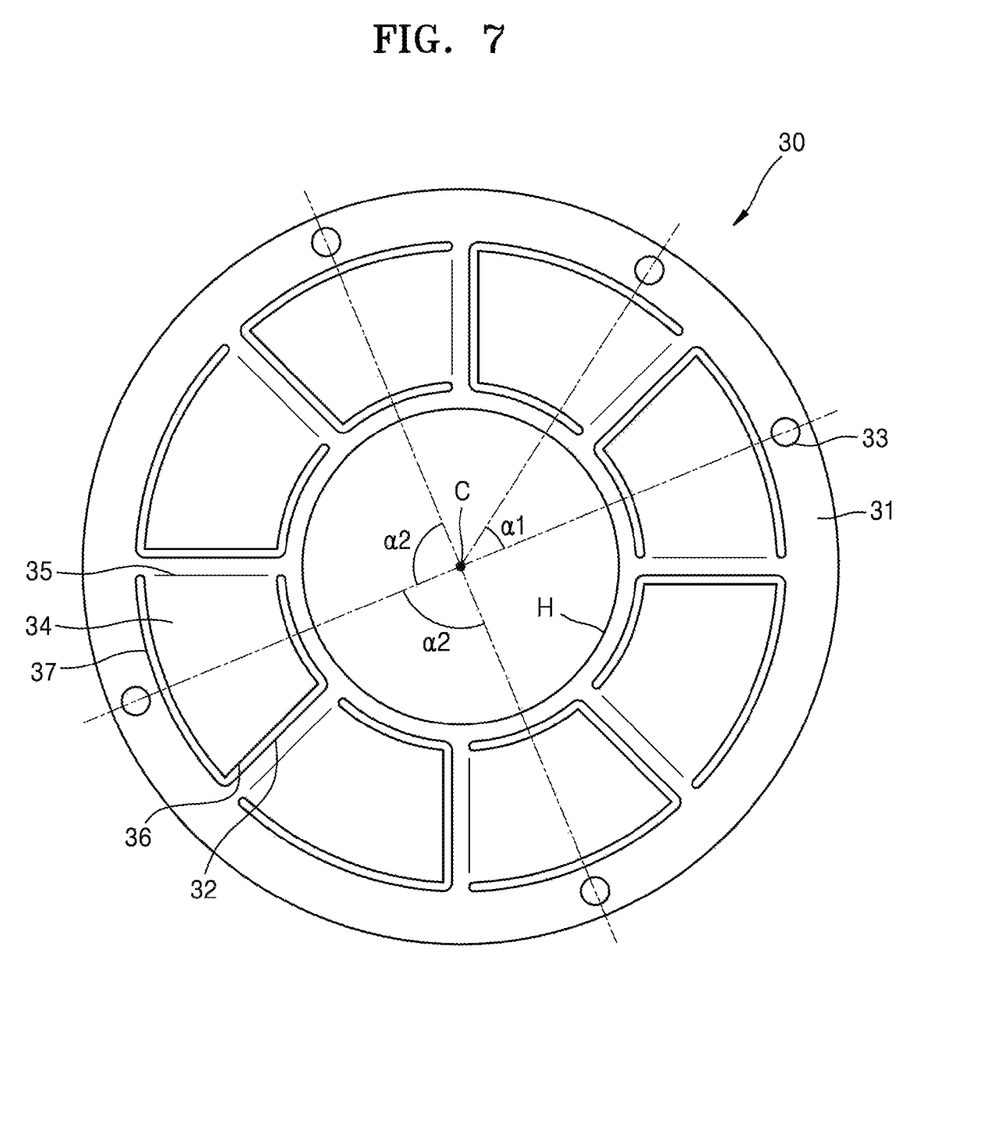
FIG. 7 is a plan view of a top plate of FIG. 2.

The top plate 30, which is a circular disc member manufactured by press processing a metal thin plate, is arranged above an upper surface of the intermediate plate 20 facing the rotating portion R. The top plate 30 may include a top plate main body 31, the second through-hole 32, a bearing mounting hole 33, and a top foil 34.

The bottom plate 10, the intermediate plate 20, and the top plate 30 may each be manufactured in the form of a metal thin plate of the same material, but may have different thicknesses.

The top plate main body 31, which is a circular disc portion having a center on the centerline C, has a lower surface arranged above an upper surface of the intermediate plate main body 21. The top plate main body 31 has the same diameter as the bottom plate main body 11.

The through-hole H is formed at the center of the top plate main body 31 with a center on the centerline C. The through-hole H of the top plate main body 31 has the same diameter as the through-hole H of the bottom plate main body 11.

The second through-hole 32, which is a hole having a slot shape extending long in the radial direction with respect to the centerline C, has a length and a width so that the coupling portion 12 passes through the second through-hole 32.

The second through-hole 32 is formed at a position corresponding to the first through-hole 22 and has the same length and width as the first through-hole 22.

The bearing mounting hole 33, which is a hole through which the bearing mounting pin P of the stationary portion S passes, is provided as a plurality of bearing mounting holes in the circumferential direction along an edge of the top plate main body 31.

The bearing mounting hole 33 of the top plate 30 is formed at a position corresponding to the bearing mounting hole 13 of the bottom plate 10 and the bearing mounting hole 23 of the intermediate plate 20, and the bearing mounting hole 13, the bearing mounting hole 23, and the bearing mounting hole 33 have the same diameter.

In the present embodiment, the bearing mounting holes 13, 23, and 33 of the bottom plate 10, the intermediate plate 20, and the top plate 30 are arranged on a same imaginary circumference having a center on the centerline C.

Figure 10:
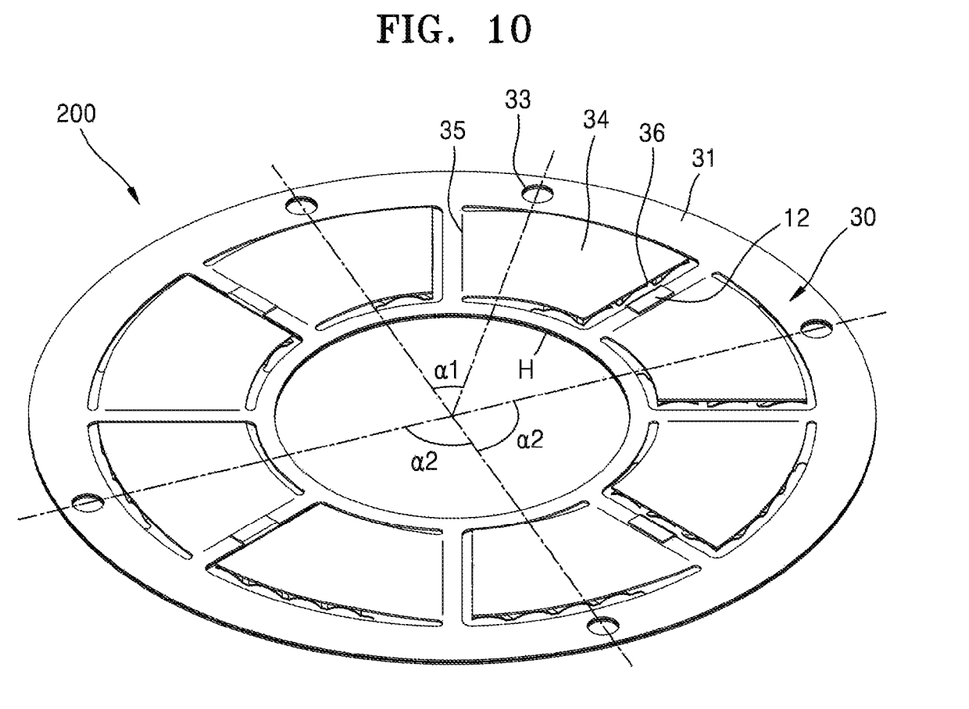
FIG. 10 is a perspective view of a bearing according to another embodiment, in which an arrangement pattern of bearing mounting holes is different from that of the bearing of FIG. 1.

Arrangement patterns of the bearing mounting holes 13, 23, and 33 on the bottom plate 10, the intermediate plate 20, and the top plate 30 may be incongruous patterns as illustrated in FIG. 10, according to a position of use of the thrust foil air bearing. FIG. 10 illustrates a thrust foil air bearing 200 according to another embodiment. The thrust foil air bearing 200 is mirror symmetric with the thrust foil air bearing 100.

In any one of the bottom plate 10, the intermediate plate 20, and the top plate 30 of the thrust foil air bearing 100, first and second arrangement angles $\alpha 1$ and $\alpha 2$ between the neighboring bearing mounting holes of the bearing mounting holes 13, 23, and 33 are asymmetrically formed to be incongruous according to a position in the circumferential direction with respect to the centerline C. The first arrangement angle $\alpha 1$ is an acute angel less than 45° and has a value less than the second arrangement angle $\alpha 2$. In the present embodiment, the first arrangement angle $\alpha 1$ is 30° and the second arrangement angle $\alpha 2$ is 90°.

Accordingly, as the arrangement patterns of a pair of the thrust foil air bearings 100 and 200 facing opposite end portions of the rotation shaft F are different from each other, an operator's error of mounting the bearings at opposite positions may be fundamentally prevented. In other words, when the operator tries to mount the thrust foil air bearing 100 at a position where the thrust foil air bearing 200 is to be mounted, the bearing mounting pins P are not inserted into the bearing mounting holes 13, 23, and 33.

The top foil 34, which is a portion having a trapezoidal planar shape, is arranged above the bump foil 24 and is contactable with the rotating portion R.

The top foil 34 is provided as a plurality of top foils spaced apart from one another at a preset interval in the circumferential direction with respect to the centerline C.

The top foil 34 has a position and size corresponding to the bump foil 24.

The top foil 34, like the bump foil 24, is formed by cutting and bending a metal thin plate filling a cut-away portion 37, which is a hole of the top plate main body 31, through a press process.

In the top foil 34, only one side 35 of two sides 35 and 36, which are spaced apart from and facing each other in the circumferential direction with respect to the centerline C, of four sides of a trapezoid, is coupled to the top plate main body 31, whereas the other three sides are free ends.

In the present embodiment, in the top foil 34, based on a flow of air with respect to the top foil 34, only the side 35 at the upstream side of the two sides spaced apart from and facing each other in the circumferential direction with respect to the centerline C is coupled to the top plate main body 31. In other words, in the top foil 34, while only the side 35 at the upstream side is coupled to the top plate main body 31, the side 36 at the downstream side is formed in a wing shape capable of performing a free motion.

In the present embodiment, the second through-hole 32 is formed around the side 36 at the downstream side of the two sides spaced apart from and facing each other in the circumferential direction with respect to the centerline C. The cut-away portion 37 between the side 36 at the downstream side of the top foil 34 and the top plate main body 31 may be the second through-hole 32.

When the coupling portion 12 of the bottom plate 10 is at the locking position, the bearing mounting holes 13, 23, and 33 of the bottom plate 10, the intermediate plate 20, and the top plate 30 are arranged in a line so that the bearing mounting pins P pass therethrough. However, when the coupling portion 12 of the bottom plate 10 is at the release position, the bearing mounting hole 13 and the bearing mounting holes 23 and 33 are not aligned in a line.

The bearing mounting pins P couples the bottom plate 10, the intermediate plate 20, and the top plate 30 by allowing the bottom plate 10, the intermediate plate 20, and the top plate 30 to slide on an imaginary plane crossing the centerline C and not to be slidably separated from one another. Also, the bearing mounting pins P prevent the coupling portion 12 from unintentionally being rotated to the release position.

In the following description, a method of assembling and mounting the thrust foil air bearing 100 having the above structure is described.

First, the intermediate plate 20 and the top plate 30 are prepared to overlap each other such that the bearing mounting hole 23 of the intermediate plate 20 and the bearing mounting hole 33 of the top plate 30 are aligned in a line. In this state, the first through-hole 22 of the intermediate plate 20 and the second through-hole 32 of the top plate 30 are aligned in a line.

Next, the intermediate plate 20 and the top plate 30 overlapped with each other are moved over the upper surface of the bottom plate 10. The intermediate plate 20 and the top plate 30 approach the bottom plate such that the coupling portion 12 at the release position is inserted into the first through-hole 22 and the second through-hole 32 of the intermediate plate 20 and the top plate 30.

Figure 4:
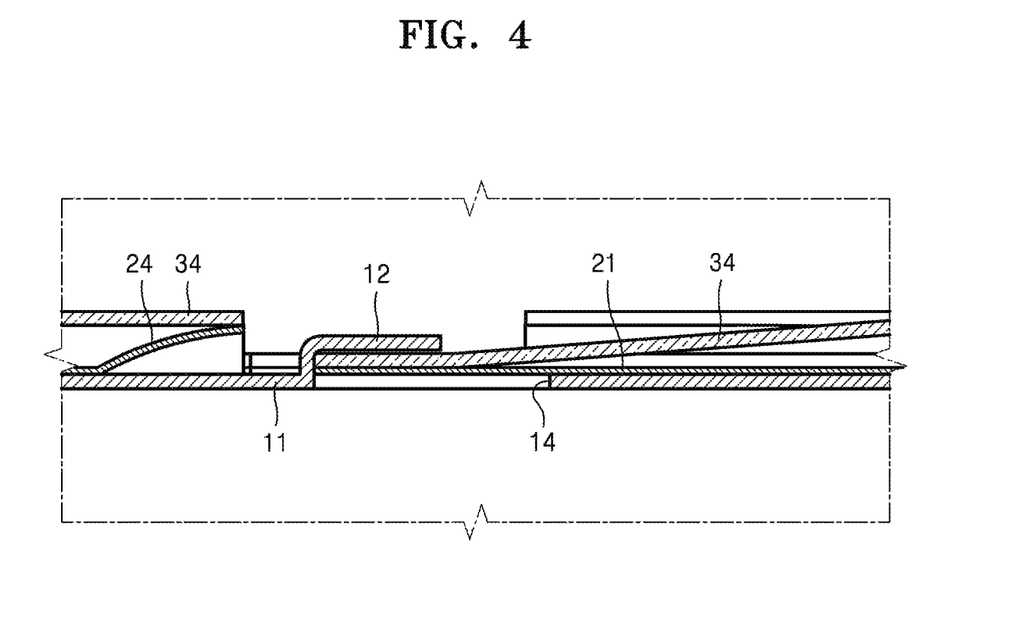
FIG. 4 is a cross-sectional view taken along a line B-B of the thrust foil air bearing of FIG. 1.

In the above state in which the coupling portion 12 passes through the first through-hole 22 and the second through-hole 32, the bottom plate 10 is rotated counterclockwise with respect to the intermediate plate 20 and the top plate 30, the coupling portion 12 is rotated to the locking position and thus an end portion of the shape "⌊" of the coupling portion 12 is detachably coupled to the top plate main body 31 and the intermediate plate main body 21, as illustrated in FIGS. 3 and 4. In this state, the bearing mounting holes 13, 23, and 33 of the bottom plate 10, the intermediate plate 20, and the top plate 30 are aligned in a line.

Finally, the thrust foil air bearing 100 having the bottom plate 10, the intermediate plate 20, and the top plate 30 coupled to one another is moved to the upper surface of the stationary portion S, and lowered such that the bearing mounting pins P of the stationary portion S are inserted into the bearing mounting holes 13, 23, and 33. After finishing the thrust foil air bearing 100 not to be separated from the bearing mounting pins P, the assembly and mounting of the thrust foil air bearing 100 are completed.

The thrust foil air bearing 100 configured as above includes: the bottom plate 10 coupled to the stationary portion S and having the coupling portion 12 protruding toward the rotating portion R; the intermediate plate 20 having the bump foil 24 arranged above the upper surface of the bottom plate 10 and elastically deformable and the first through-hole 22 through which the coupling portion 12 passes; and the top plate 30 arranged above the upper surface of the intermediate plate 20 and facing the rotating portion R, and having the top foil 34 arranged above the bump foil 24 and contactable with the rotating portion R and the second through-hole 32, through which the coupling portion 12 passes, formed at a position corresponding to the first through-hole 22. Since the bottom plate 10, the intermediate plate 20, and the top plate 30 are coupled to one another with the coupling portion 12 passing through the first through-hole 22 and the second through-hole 32, the bearing may be quickly assembled without a complicated process such as welding.

In the thrust foil air bearing 100, since the coupling portion 12 of the bottom plate 10 is rotatable around the centerline C between the locking position where the coupling portion 12 is detachably coupled to the intermediate plate 20 and the top plate 30 and the release position where the coupling portion 12 is separable from the intermediate plate 20 and the top plate 30, and the top plate 30, the bottom plate 10, the intermediate plate 20, and the top plate 30 may be coupled to one another by a simple manipulation of relatively rotating the bottom plate 10 with respect to the intermediate plate 20.

Furthermore, in the thrust foil air bearing 100, since the coupling portion 12 is previously bent in the shape of "⌉", the coupling portion 12 may be moved to the locking position by a simple manipulation of relatively rotating the bottom plate 10 with respect to the intermediate plate 20 and the top plate 30.

In the thrust foil air bearing 100, since the first through-hole 22 and the second to through-hole 32 have a slot shape extending long in the radial direction with respect to the centerline C, by forming the coupling portion 12 long in the radial direction with respect to the centerline C, an area where the coupling portion 12 contacts the upper surface of the top plate main body 31 is increased so that a coupling force of the coupling portion 12 may be increased, and the position of the coupling portion 12 may be easily selected on an imaginary line in the radial direction with respect to the centerline C.

Furthermore, in the thrust foil air bearing 100, the bump foil 24 and the top foil 4 each are plurally provided in the circumferential direction with respect to the centerline C, and the bump foil 24 has one end coupled to the intermediate plate main body 21 and the other end formed in a wing shape capable of performing a free motion, and the top foil 4 has one end coupled to the top plate main body 31 and the other end formed in a wing shape capable of performing a free motion, the first through-hole 22 is naturally formed between the other end of the bump foil 24 and the intermediate plate main body 21 without forming a separated through-hole, and the second through-hole 32 is naturally formed between the other end of the top foil 34 and the top plate main body 31.

Since the stationary portion S includes the bearing mounting pins P that are protruding rod members and the bottom plate 10, the intermediate plate 20, and the top plate 30 include the bearing mounting holes 13, 23, and 33 through which the bearing mounting pins P pass, the thrust foil air bearing 100 may be conveniently mounted on the stationary portion S by using the bearing mounting pins P that are easily obtained and have large structural strength.

Furthermore, in the thrust foil air bearing 100, since the coupling portion 12 of the bottom plate 10 is rotatable around the centerline C between the locking position where the coupling portion 12 is detachably coupled to the intermediate plate 20 and the top plate 30 and the release position where the coupling portion 12 is separable from the intermediate plate 20 and the top plate 30, and when the coupling portion 12 is at the locking position, the bearing mounting holes 13, 23, and 33 of the bottom plate 10, the intermediate plate 20, and the top plate 30 are aligned in a line so that the bearing mounting pins P may pass through the bearing mounting holes 13, 23, and 33, by inserting the bearing mounting pins P into the bearing mounting holes 13, 23, and 33, the bottom plate 10, the intermediate plate 20, and the top plate 30 are coupled to one another on the imaginary plane crossing the centerline C not to be slidably separated from one another, and further, the coupling portion 12 is prevented from unintentionally being rotated to the release position.

In the thrust foil air bearing 100, since the arrangement patterns of the bearing mounting holes 13, 23, and 33 respectively formed in the bottom plate 10, the intermediate plate 20, and the top plate 30 are incongruous according to the position of use of the thrust foil air bearing, when a pair of the thrust foil air bearings 100 and 200 are mounted facing the two rotating portions R coupled to the opposite end portions of the rotation shaft F, an operator's error of mounting the bearings at opposite positions may be fundamentally prevented.

Furthermore, since the bottom plate 10, the intermediate plate 20, and the top plate 30 all have shapes that are quickly formed by a press process, the thrust foil air bearing 100 is suitable for mass production, compared to a method using welding, for example.

In the present embodiment, although the coupling portion 12 is previously bent in a shape of "⌐", the coupling portion 12 may initially have a shape of "–" and then is plastically deformed to be bent in the shape of "⌐" after passing through the first through-hole 22 and the second through-hole 32.

In the present embodiment, although the bottom plate 10, the intermediate plate to 20, and the top plate 30 are mounted one for each, at least any one of the bottom plate 10, the intermediate plate 20, and the top plate 30 may be mounted two or more for each.

In the present embodiment, although the arrangement patterns of the bearing mounting holes 13, 23, and 33 in the bottom plate 10, the intermediate plate 20, and is the top plate 30 are adjusted by changing the arrangement angles α1 and α2 formed by the neighboring bearing mounting holes 13, 23, and 33, the arrangement patterns may be adjusted by separately changing the distance from the centerline C to each of the bearing mounting holes 13, 23, and 33.

While the present inventive concept has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present inventive concept as defined by the following claims.

What is claimed is:

1. A thrust foil air bearing for use in an apparatus comprising a stationary portion and a rotating portion relatively rotating around a centerline with respect to the stationary portion, the thrust foil air bearing comprising:
    a bottom plate coupled to the stationary portion and comprising a coupling to portion protruding toward the rotating portion;
    an intermediate plate arranged above an upper surface of the bottom plate and comprising a bump foil that is elastically deformable and a first through-hole through which the coupling portion passes; and
    a top plate arranged above an upper surface of the intermediate plate, facing the rotating portion, and comprising a top foil arranged above the bump foil and contactable with the rotating portion and a second through-hole, through which the coupling portion passes, formed at a position corresponding to the first through-hole,
    wherein the coupling portion couples the bottom plate, the intermediate plate, and the top plate to one another by passing through the first through-hole and the second through-hole.

2. The thrust foil air bearing of claim 1, wherein the coupling portion of the bottom plate is rotatable around the centerline between a locking position, where the coupling portion is detachably coupled to the intermediate plate and the top plate, and a release position, where the coupling portion is separable from the intermediate plate and the top plate.

3. The thrust foil air bearing of claim 2, wherein the coupling portion is previously bent in a shape of "⌐" or is bent in a shape of "⌐" after passing though the first through-hole and the second through-hole.

4. The thrust foil air bearing of claim 1, wherein the first through-hole and the second through-hole have a slot shape extending along a radial direction with respect to the centerline.

5. The thrust foil air bearing of claim 1, wherein each of the bump foil and top foil is plurally provided in a circumferential direction with respect to the centerline,
    the bump foil has one end coupled to an intermediate plate main body and another end formed in a wing shape and capable of performing a free motion, and the top foil has one end coupled to a top plate main body and another end formed in a wing shape and capable of performing a free motion, and the first through-hole is formed between the other end of the bump foil and the intermediate plate main body, and the second through-hole is formed between the other end of the top foil and the top plate main body.

6. The thrust foil air bearing of claim 1, wherein the stationary portion comprises a bearing mounting pin that is a protruding rod member, and
each of the bottom plate, the intermediate plate, and the top plate comprises a bearing mounting hole through which the bearing mounting pin passes.

7. The thrust foil air bearing of claim 6, wherein the coupling portion of the bottom plate is rotatable around the centerline between a locking position, where the coupling portion is detachably coupled to the intermediate plate and the top plate, and a release position, where the coupling portion is separable from the intermediate plate and the top plate, and
when the coupling portion is at the locking position, the bearing mounting holes of the bottom plate, the intermediate plate, and the top plate are aligned in a line so that the bearing mounting pin passes through the bearing mounting holes.

8. The thrust foil air bearing of claim 6, wherein each of the bearing mounting holes of the bottom plate, the intermediate plate, and the top plate are plurally provided in the circumferential direction with respect to the centerline, and
arrangement patterns of the bearing mounting holes formed in the bottom plate, the intermediate plate, and the top plate are different patterns according to a position of use of the thrust foil air bearing.

* * * * *